United States Patent [19]

Forsberg et al.

[11] Patent Number: 4,464,769

[45] Date of Patent: Aug. 7, 1984

[54] METHOD AND APPARATUS FOR SYNCHRONIZING A BINARY DATA SIGNAL

[75] Inventors: Gunnar S. Forsberg, Stockholm; Lars P. Ingre, Huddinge, both of Sweden

[73] Assignee: Telefonaktiebolaget L M Ericsson, Stockholm, Sweden

[21] Appl. No.: 315,528

[22] PCT Filed: Mar. 10, 1981

[86] PCT No.: PCT/SE81/00075

§ 371 Date: Oct. 23, 1981

§ 102(e) Date: Oct. 23, 1981

[87] PCT Pub. No.: WO81/02654

PCT Pub. Date: Sep. 17, 1981

[51] Int. Cl.³ .............................................. H04L 7/04
[52] U.S. Cl. ..................... 375/110; 375/118; 328/109
[58] Field of Search ....................... 375/110, 118, 111; 370/103, 108; 360/51; 328/63, 72, 108, 109, 110, 151; 307/480, 513, 516

[56] References Cited

U.S. PATENT DOCUMENTS

| | | | |
|---|---|---|---|
| 3,631,463 | 12/1971 | Murphy | 375/110 |
| 3,697,881 | 10/1972 | Nakagome et al. | 328/109 |
| 3,936,602 | 2/1976 | Korver | 370/108 |
| 4,010,323 | 3/1977 | Peck | 375/118 |
| 4,128,828 | 12/1978 | Samejima et al. | 375/89 |
| 4,208,724 | 6/1980 | Rattlingourd | 375/118 |

Primary Examiner—Robert L. Griffin
Assistant Examiner—Stephen Chin
Attorney, Agent, or Firm—Roberts Spiecens & Cohen

[57] ABSTRACT

A method and apparatus in a receiver for data signals for correctly detecting a transmitted message with the aid of a local clock signal which is asynchronous in relation to the received data signal. A condition hereby is that the addition of fall-away of sporadic binary characters in the message do not have any effect. This condition is met in a redundant system, for example, in which the same message of a fixed number of bits is sent repeatedly in sequence and the receiver accepts the message providing it detects the same message a given number of times during a given time. According to the method, the incoming data signal (A) is first clocked with a phase-corrected clock signal (F) and thereafter once again with the uncorrected clock signal (B).

4 Claims, 5 Drawing Figures

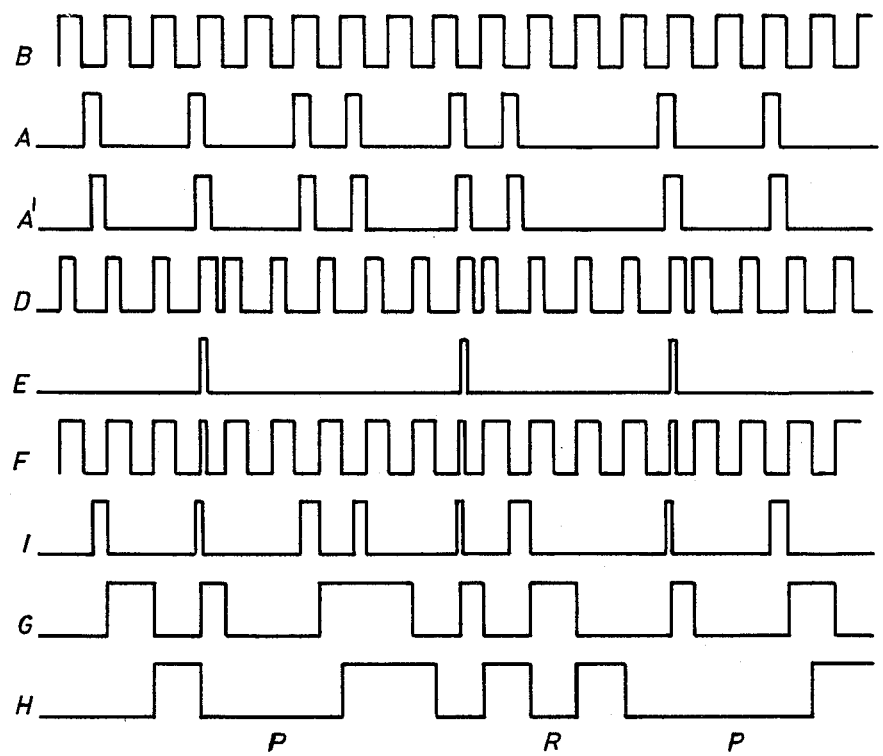

METHOD AND APPARATUS FOR SYNCHRONIZING A BINARY DATA SIGNAL

TECHNICAL FIELD

The present invention relates to a method and apparatus for synchronizing a binary data signal coming to a receiver having a locally available.

The binary data signal can be of the so-called RZ type (return to zero) or of the so-called NRZ type (non-return to zero).

BACKGROUND ART

The synchronizing problem is always present in all data transmission, and is solved depending on the application, demand on accuracy etc. in different ways. For example, if the Transmitter and Receiver side clocks are synchronized, possibly against a common reference, the detection of data at the Receiver side does not cause any problems of course. Synchronizing of a Receiver clock can be in a mode such that the timing information is extracted from the transmitted data signal, e.g. by time determination of its zero crossings, subsequent to which a signal corresponding to the timing information is allowed to actuate a controllable local clock signal generator. Requirements in respect to transient time and permitted error in the data transmission naturally affects the selection of the synchronizing method also.

DISCLOSURE OF INVENTION

The technical problem in the present case lies in correctly detecting, with the aid of a signal which is asynchronus to the data signal, of a message sent to the receiver, with the condition that the addition or fall-away of a binary character in the message has no effect. This condition is fulfilled in a redundant system, for example, in which the same message of a fixed number of bits is sent repeatedly in succession and the receiver accepts the message on condition that it can detect the same message a given number of times during a given time. If the addition or fall-away of a binary character in the data signal occurs relatively rarely, such an occassional happening would thus not effect the receiver's correct detection of the message.

The clock signal being asynchronous must naturally not signify that there is a too great frequency deviation from the correct value. A frequency deviation in the order of magnitude of one per thousand gives rise, in accordance with the invention, to addition or fall-away of information in approximately every thousandth bit position, which can be accepted in many applications.

The solution of this problem proposed by the present invention is characterized in the appended patent claims. The first advantage with an apparatus in accordance with the invention is its extreme simplicity and meagre power requirement.

BRIEF DESCRIPTION OF DRAWINGS

The invention will now be described with the aid of some embodiments with reference to the appended drawing on which FIG. 5 illustrates the same signals as in FIG. 4, for another embodiment.

BEST MODE OF CARRYING OUT THE INVENTION

Figure 1:
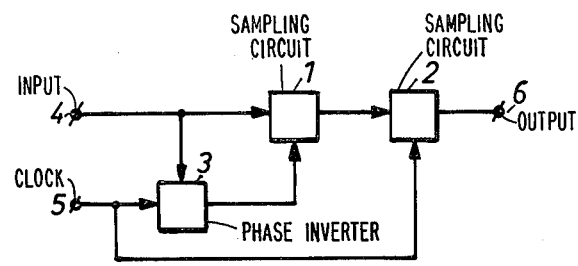
FIG. 1 is a block diagram of an apparatus in accordance with the invention.

FIG. 1 is a block diagram of an apparatus in accordance with the invention. Between a data input 4 and a data output 6 there is a first sampling circuit 1 and a second sampling circuit 2 coupled in series. A phase-reversing circuit (or phase inverter) 3 is connected between a clock input 5 and the clock signal input on the first sampling circuit 1. The second sampling circuit 2 is clocked directly from the clock input 5.

The data signal transmitted from the transmitter side is applied to the data input 4, and this signal is assumed to be a binary coded signal of the RZ or NRZ type, according to what has been mentioned above. The data signal is sampled with the aid of the clock signal on the clock input 5, the clock signal being asynchronous relative the data signal, according to the assumptions, to give on the data output a signal synchronous with the clock signal and corresponding to the input data signal.

The phase-reversing circuit 3, which will be described more fully below, reverses the phase of the clock signal to the first sampling circuit when, as a result of the frequency difference between data signal and clock signal, positive or negative flanks in the respective signal tend to coincide.

In the preferred embodiment the sampling circuits 1 and 2 are realized with the aid of ordinary positively flank-triggered D flip-flops. The clock signal is assumed to have 50% pulse rate and the input data to be a signal of the NRZ type. For these assumptions, FIG. 4 illustrates the time sequence for a plurality of signals in the apparatus of FIG. 1.

Figure 2:
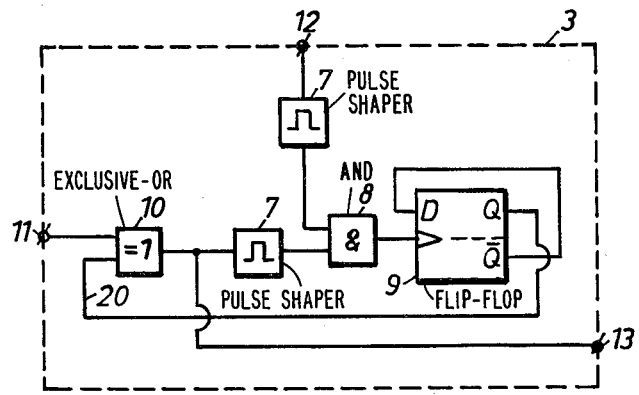
FIG. 2 is a phase-reversing circuit incorporated in the apparatus according to FIG. 1.

FIG. 2 illustrates an embodiment of the phase reversing circuit 3. The circuit has a data input 12, a clock signal input 11 and a clock signal output 13. The EXCLUSIVE-OR circuit 10 can be regarded as a controlled inverting circuit. If the input from line 20 is namely zeroed, the clock signal from the input 11 passes unaffected with the exception of a lag of no interest in this connection. Two pulse-shaping circuits 7 are connected with their inputs to the EXCLUSIVE-OR circuit output and the data input 12. These are so formed that on their respective output they deliver a square pulse of given duration when the input signal has a positive flank. The pulse length is short in relation to the digit time slot of the data signal in question. A coincidence detector in the form of an AND circuit 8 with its inputs connected to the outputs of the pulse shaping circuits sends a pulse on its output when the output signals from the circuits 7 overlap each other. Such a coincidence-making pulse is allowed to clock a positive flank triggered D-flip-flop 9, connected as a binary counter. The Q output from the flip-flop is connected to the input 20 on the EXCLUSIVE-OR circuit 10. This arrangement thus signifies that a small distance between a positive data flank and a positive clock signal flank reverses the phase in the signal on output 13 by 180°.

Figure 4:
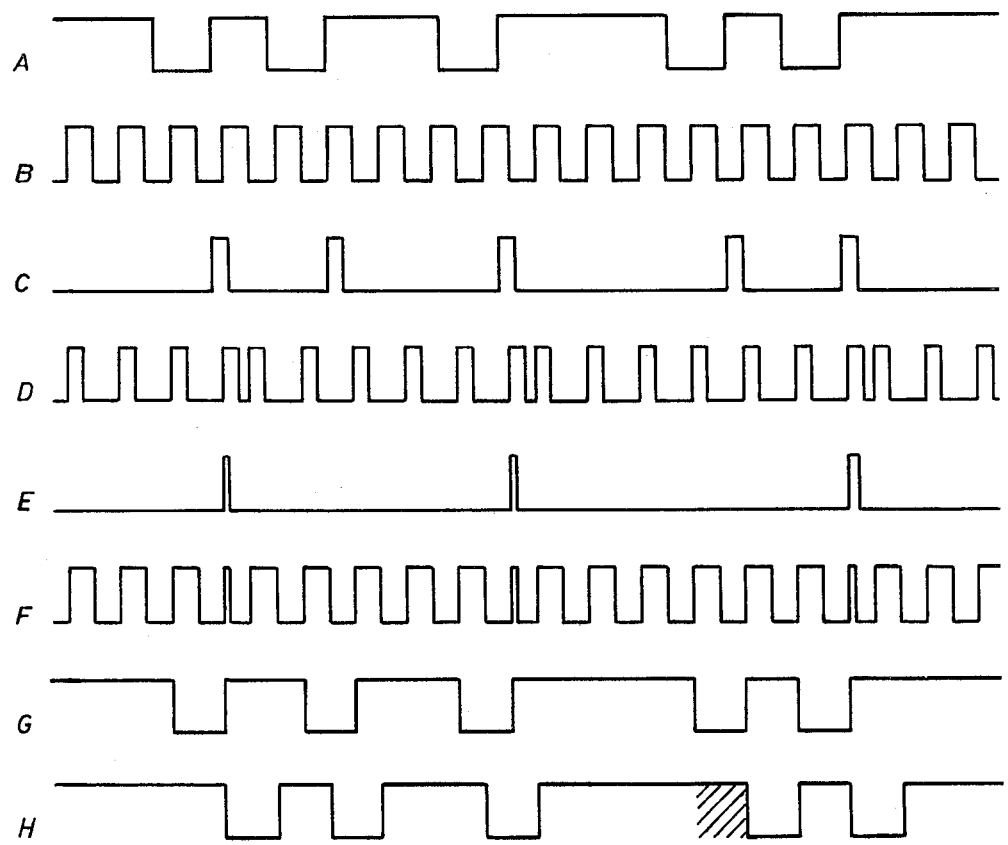
FIG. 4 illustrates the time sequence for a plurality of signals in the apparatus according to FIG. 1.

In FIG. 4 the signal A shows an input data flow of the NRZ type. This signal will thus be detected in the receiver with the aid of the local asynchronous clock signal B. The bit rate for data is illustrated as being constant, as well as the frequency of the clock signal. In general, these quantities can however be permitted to drift in relation to each other.

It will be seen immediately that it would not be possible to directly synchronize input data with the clock signal B (FIG. 4). In accordance with the inventive idea as described above in connection with FIG. 2, there are now created positive pulses C when positive flanks in the input data A are detected. Positive pulses D are formed in the same way when positive flanks are detected in the possibly phase-shifted clock signal on the output from the EXCLUSIVE-OR circuit 10 according to FIG. 2. For the positive flank occurring first in the input data there is obtained an overlap, coincidence, between the positive pulses thus formed. This is indicated by the pulse in the signal E. According to the above, this pulse controls the phase reversal of the incoming clock signal applied to the input 11 according to FIG. 2. Two further coincidences are marked in the signal E. The clock signal corrected by the phase reversal is illustrated by the signal F. In accordance with what has been said hereinbefore, this signal constitutes the clock signal to the first sampling circuit 1. The output signal from this sampling circuit has been denoted by the letter G.

In accordance with the inventive idea, this signal G will now be clocked in a second sampling circuit 2 by the unaffected clock signal in the receiver. The resulting output signal from the second sampling circuit, which thus constitutes the synchronized data signal has been given the denotation H. It will be observed that the second phase reversal of the clock signal resulted in a distortion of the data signal in the form of an addition of one bit, marked by shading in the figure. In actual fact, such distortion is obtained in every second phase shift of the clock signal. The asynchronous relationship has been exaggerated to illustrate the modus operandi of the invention, which has resulted in the closely occurring phase reversals. In an actual application of the invention, these phase reversals occur with a time spacing which is greater by several powers of 10, as mentioned above.

Figure 3:
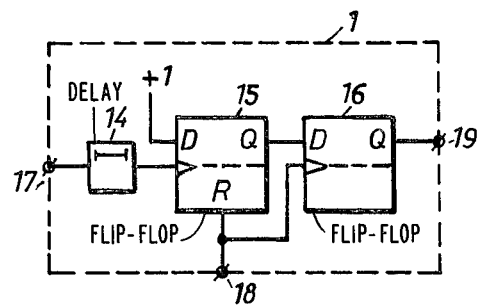
FIG. 3 is a first sampling circuit incorporated in the apparatus according to FIG. 1.

In a second embodiment of the invention adapted for input data in the form of a RZ-type signal, the first sampling circuit 1, in the form of a simple D flip flop has been replaced with the circuit according to FIG. 3. This circuit is provided with a data input 17, a clock signal input 18 and an output 19 to the subsequent sampling circuit 2. The circuit function will be described below while referring to FIG. 5, showing simultaneous values for a plurality of signals in the apparatus.

The signal A in FIG. 5, showing the input signal to the first sampling circuit 1, is thus RZ-type input data. This signal will be detected in the receiver with the aid of the local asynchronous clock signal B and converted to an NRZ signal synchronous with clock signal B.

The upper pulse-forming circuit 7 in FIG. 2 has, as before, the task of generating a short positive pulse at the positive flank of the signal A. When the input signal is of the RZ type, one could possibly imagine that this pulse-shaping circuit is unnecessary since the RZ signal consists of short pulses. In the cases where the pulse rate of the incoming RZ signal is extremely small, or very large, this pulse-shaping circuit is necessary, however. In the case described in FIG. 5, we assume for the sake of simplicity that the output signal from said pulse-shaping circuit is the same as the signal A, i.e. in this particular case the circuit is superfluous.

A delay circuit 14 is connected to the data input 17 on the circuit according to FIG. 3. The delay in this is great in comparison with the delay in the D flip-flop 15, but small in comparison to the duration of the pulses from the circuit 7 in FIG. 2. The delayed signal is denoted by A'. In the sequence illustrated in FIG. 5, the delay has no importance, and therefore its function will be explained later.

The function block in FIG. 2 has already been described. The signals D, E and F in FIG. 5 correspond to signals with the same denotation in FIG. 4.

When RZ pulses A' arive at the clock input on the D flip flop 15 in FIG. 3, the flip-flop is set in the one state, and the output signal from the Q output corresponds to the signal I in FIG. 5. A fixed voltage corresponding to a logical one is applied to the data input of the flip-flop the whole time. After some time, the flip-flop is reset by a signal on its R input coming from the output 13 in FIG. 2. This signal is denoted as reference character F in FIG. 5. Detection and phase reversal on coincidence between signal A and signal D prevent the flip-flop 15 from being reset immediately after or simultaneously with it being clocked. Coincidence occurs in good time before the front flanks of the signals D and A coincide, and coincidence generates the signal E which in turn generates phase shift in the signal D.

The signal D also has the task of clocking the flip-flop 16 in FIG. 3. Since the time delay between the signals at input R and Q output at the flip-flop 15 is much greater than the time which data must remain stable on the D input of the flip-flop 16, there is no problem in clocking in data in the flip-flop 16 before they disappear, provided that the flip-flops 15 and 16 are in the same circuit family.

If no pulse occurs in the signal A, i.e. a logical zero has been sent, the Q input on the flip-flop 16 will remain zeroed, which results in that a zero is clocked in on this flip-flop. Signal G is on the output 19 of the flip-flop 16 and on the output from flip-flop 2 in FIG. 1 there is the signal H.

The indications P in the signal H in FIG. 5 denote data errors. Data should have been 1 for both indications. Irrespective of what values the signal A has for corresponding times, a zero is obtained in the signal H for alternate pulses in the signal E.

The notation R in the signal H denotes an extra bit analogous with the dashed extra bit according to FIG. 4.

The necessity of using a delaying circuit 14 is not directly apparent from FIG. 5. The delaying function is only required when the frequency of the clock signal B is lower than the bit frequency of the data signal, i.e. for the opposite situation when compared with FIG. 5.

Assume that the clock frequency B is lower than the bit frequency. Assume further that the delaying circuit 14 is bypassed to start with. The rear flank on the pulses in the signal D will then successively approach the front flank of the pulses in signal A. For the signal D to shift phase, the signals A and D must slightly overlap each other so that the pulses E will be sufficiently long. This situation immediately before phase reversal causes problems, since the D flip flop 15 is clocked simultaneously as the signal on the R input is high.

By introducing the delaying circuit 14, this problem does not occur since one obtains phase reversal before the positive flank in the signal A and the negative flank in the signal D coincide. A prerequisite of this is naturally that the delay is sufficiently long for the signal E to have time to cause phase shift before the flanks coincide.

What we claim is:

1. In a receiver of binary coded data signals in the form of pulses having flanks, apparatus for synchronizing an incoming data signal(A) with a local clock signal(B) in the form of pulses having flanks available in the receiver, comprising:
    (a) a first and a second sampling circuit(1,2) each provided with a data input, a data output and a clock input,
    (b) a phase-reversing circuit(3) provided with a first and a second input and an output,
    the data output of said first sampling circuit being the input of the apparatus and being adapted to receive the data signal arriving at the receiver, means for connecting the data output of said first sampling circuit to the data input of the second sampling circuit, the data output of said second sampling circuit being the output of the apparatus, means for feeding the local clock signal to the clock input of said second sampling circuit and the first input of said phase-reversing circuit, the second input of said phase-reversing circuit being adapted to receive the data signal, and means connecting the output of said phase-reversing circuit to the clock input of the first sampling circuit for applying thereto a corrected clock signal in response to the relative position between the flanks of pulses in the data signal and clock signal.

2. Apparatus as claimed in claim 1 wherein said first and said second sampling circuits comprise positively flank-triggered D flip flops.

3. An apparatus as claimed in claim 1 wherein said phase-reversing circuit comprises:
    (a) a controlled inverting circuit provided with a first and a second input and an output whereby its first input is connected to the clock signal input of the phase-reversing circuit and its output is connected to the clock signal output of the phase-reversing circuit,
    (b) a first and a second pulse-shaping circuit, each provided with an input and an output, whereby the input of said first pulse-shaping circuit is connected to the output of said controlling inverting circuit and the input of said second pulse-shaping circuit being connected to the data input of the phase-reversing circuit,
    (c) a coincidence detector provided with two inputs and one output whereby the inputs are connected to the outputs of the pulse-shaping circuits, and
    (d) a positive flank triggered D-flip flop provided with a clock signal input, a data input, a data output and an inverted data output whereby its clock signal input is connected to the output of the coincidence detector, its data input is connected to its inverted output and its data output is connected to the second input of the inverting circuit.

4. In a receiver of binary coded data signals in the form of pulses having flanks, a method for synchronizing the incoming data signals with local clock signals in the form of pulses having flanks, the clock signals being provided by the receiver, the method comprising the steps of (I) generating phase corrected clock signals from the local clock signals, the phase corrected clock signals having the same frequency as the local clock signals but undergoing a 180° phase shift whenever a flank of a pulse of the generated phase corrected clock signals tend to coincide with a corresponding flank of a pulse of the incoming data signals; (II) sampling the incoming data signals with the phase corrected clock signals to form initially sampled data signals; and (III) further sampling the initially sampled data signals with the local clock signals to provide synchronized data signals.

* * * * *